United States Patent [19]

Collins et al.

[11] Patent Number: 5,038,922

[45] Date of Patent: Aug. 13, 1991

[54] HIGH SPEED LINE SHAFT CONVEYOR

[75] Inventors: Ellsworth H. Collins, Shepherdsville; James F. Mattingly, Louisville, both of Ky.

[73] Assignee: The Interlake Companies, Inc., Shepherdsville, Ky.

[21] Appl. No.: 578,426

[22] Filed: Sep. 5, 1990

[51] Int. Cl.⁵ .......................................... B65G 13/06
[52] U.S. Cl. .................................... 198/781; 198/791
[58] Field of Search ............... 198/781, 782, 784, 789, 198/790

[56] References Cited

U.S. PATENT DOCUMENTS

| | | |
|---|---|---|
| 1,735,767 | 11/1929 | Keller . |
| 2,194,219 | 3/1940 | Eggleston ............................ 198/789 |
| 2,748,919 | 6/1956 | Britton et al. . |
| 3,264,814 | 8/1966 | Kuster et al. . |
| 3,667,589 | 6/1972 | Constable . |
| 3,729,088 | 4/1973 | Stein et al. . |
| 3,810,538 | 5/1974 | Moyes . |
| 3,877,565 | 4/1975 | Werntz . |
| 3,961,700 | 6/1976 | Fleischauer . |
| 4,006,815 | 2/1977 | Werntz ........................... 198/784 X |
| 4,103,769 | 8/1978 | Jorgensen . |
| 4,108,303 | 8/1978 | Vogt et al. . |
| 4,185,735 | 1/1980 | Hammond ............................ 198/789 |
| 4,193,492 | 3/1980 | Hammond . |
| 4,344,527 | 8/1982 | Vogt et al. ....................... 198/789 X |
| 4,609,098 | 9/1986 | Morgan et al. ....................... 198/781 |
| 4,733,772 | 3/1988 | Potter ............................. 198/789 X |
| 4,819,787 | 4/1989 | Burkhardt ........................... 198/781 |

FOREIGN PATENT DOCUMENTS

| | | | |
|---|---|---|---|
| 1135210 | 11/1982 | Canada ................................. 198/789 |
| 0129911 | 1/1985 | European Pat. Off. ............ 198/791 |
| 3426598 | 7/1984 | Fed. Rep. of Germany . |
| 3323718 | 1/1985 | Fed. Rep. of Germany ...... 198/791 |
| 3401634 | 7/1985 | Fed. Rep. of Germany ...... 198/791 |
| 3629620 | 3/1988 | Fed. Rep. of Germany ...... 198/791 |
| 2540841 | 8/1984 | France ............................... 198/791 |
| 61-254405 | 11/1986 | Japan . |
| 2078184 | 5/1981 | United Kingdom . |

Primary Examiner—D. Glenn Dayoan
Attorney, Agent, or Firm—Theresa Fritz Camoriano

[57] ABSTRACT

A conveyor designed for high speed operations includes a drive shaft, a first friction wheel having a beveled end and mounted on the drive shaft, a second friction wheel mounted on the conveyor frame and having a beveled end which mates with the beveled end of the first friction wheel, and a drive wheel mounted on the same shaft as the second friction wheel, wherein the drive wheel contacts at least one of the conveyor rollers.

11 Claims, 3 Drawing Sheets

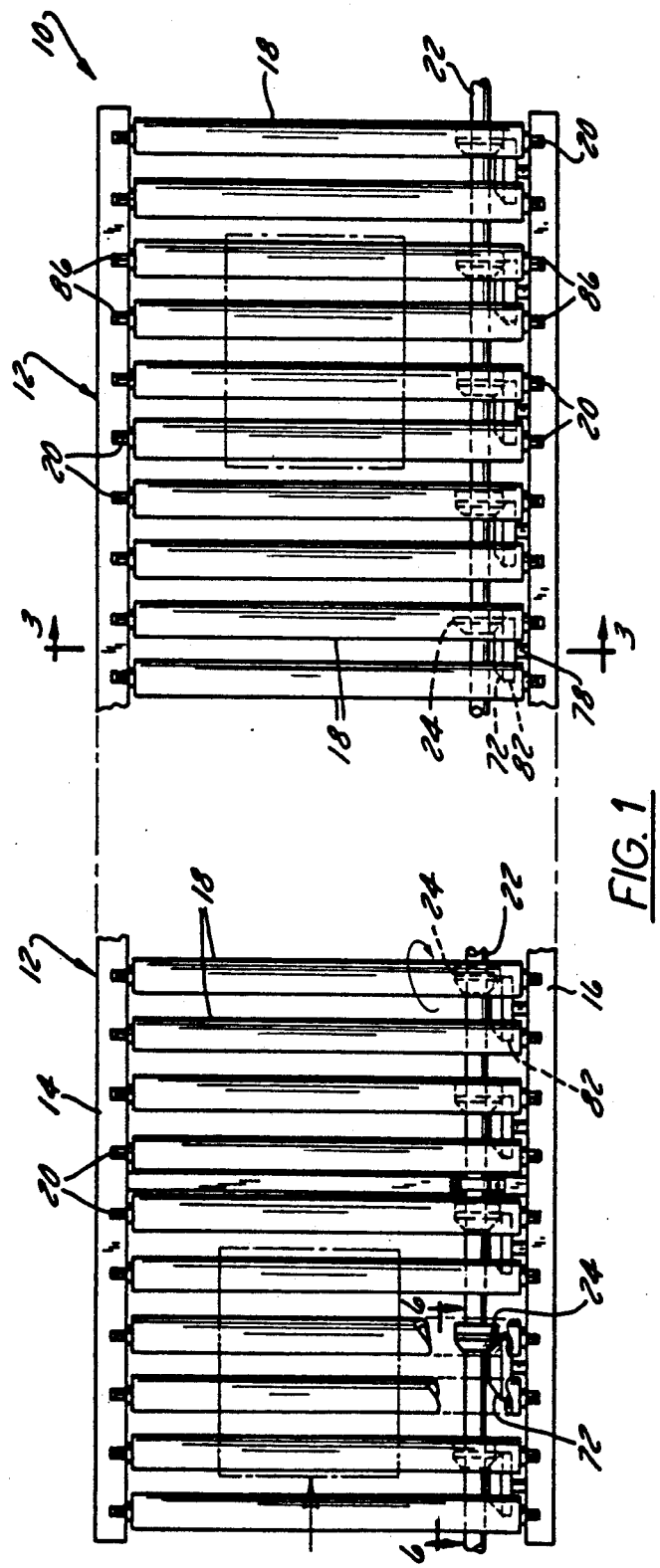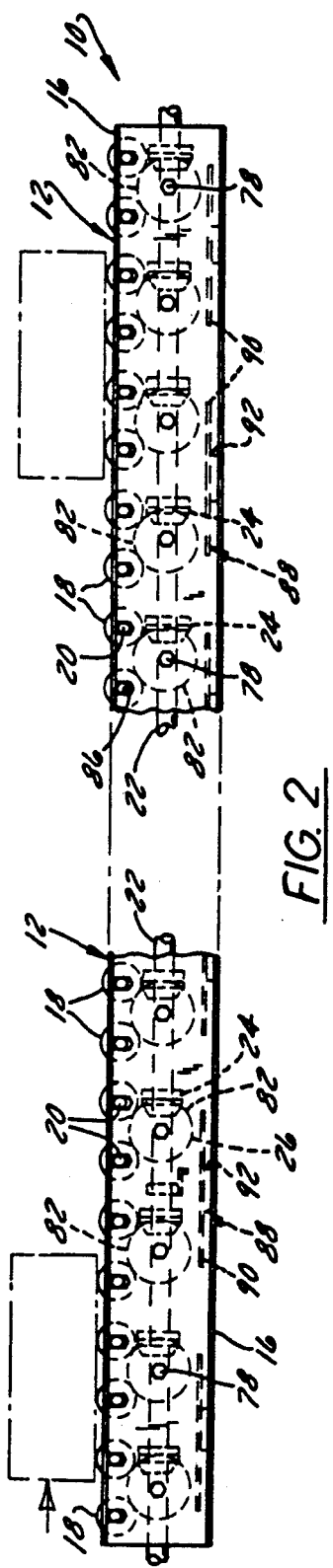

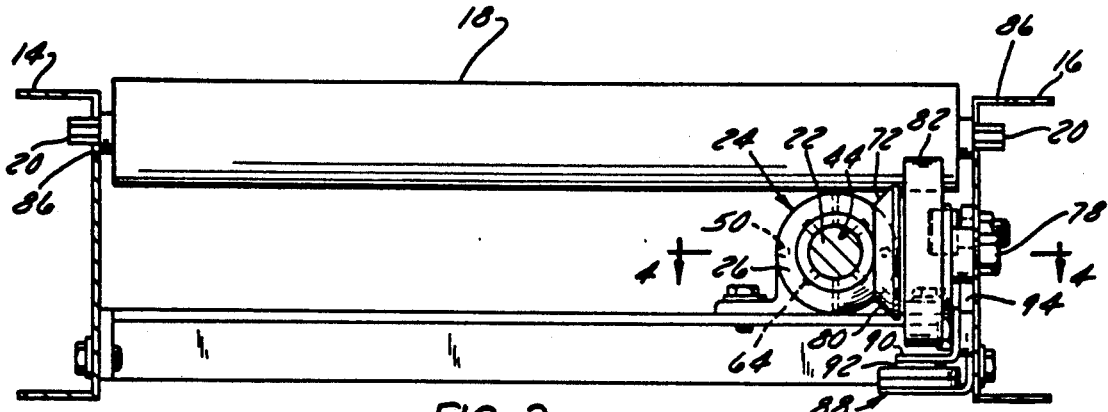
FIG. 3
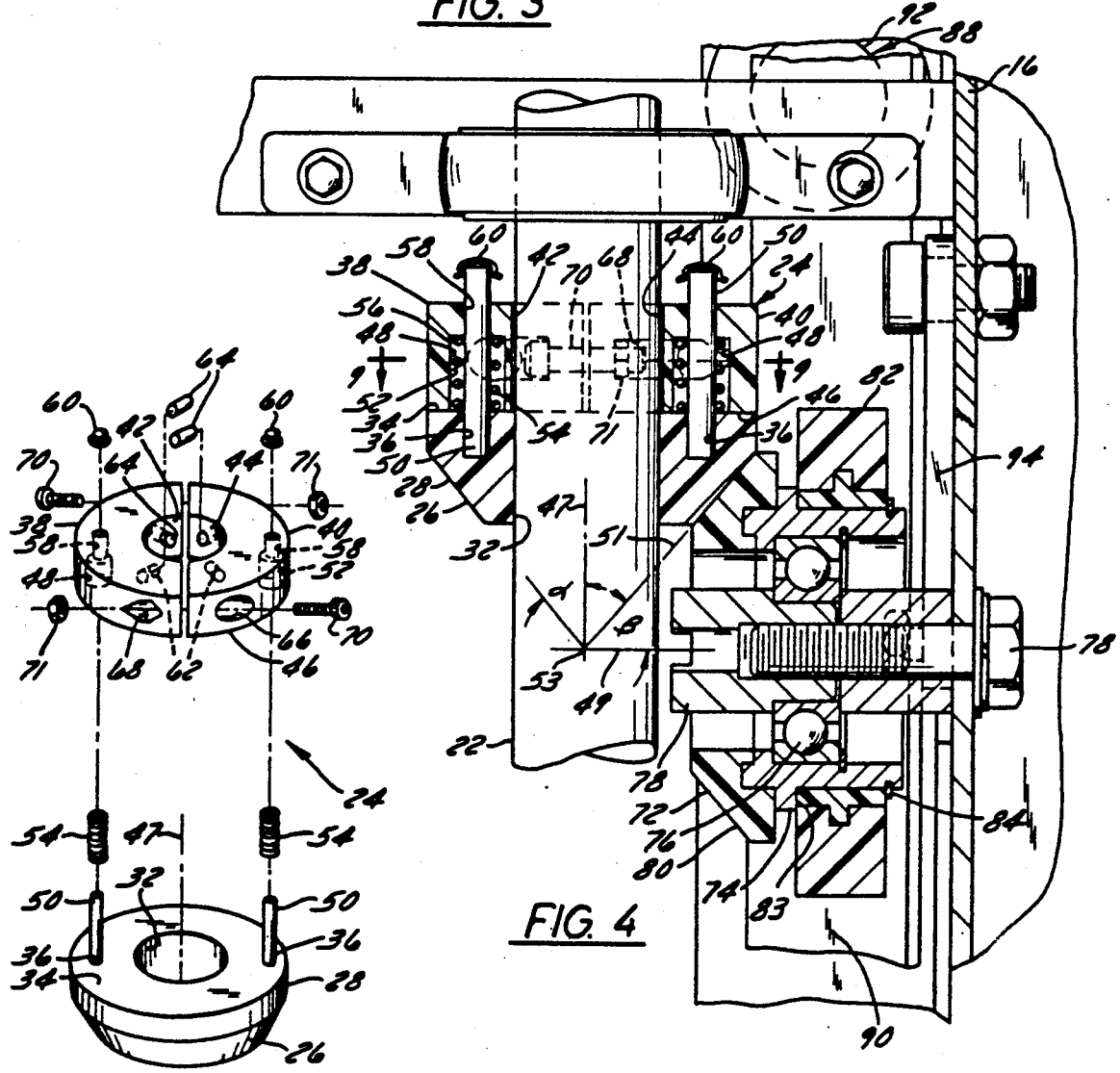
FIG. 4
FIG. 5

HIGH SPEED LINE SHAFT CONVEYOR

BACKGROUND OF THE INVENTION

The present invention relates to a line shaft conveyor which is particularly suited to high speed applications.

In the past, most high speed conveyors were made using flat belts or chains to drive the conveyor rollers. These conveyors generally cannot run at rates about 240 feet per minute, due to the limitation in chain speed, bearing limitations, or chain or belt vibrations. These chain and belt drives also had to be broken into sections with separate drives for long conveyors, due to the limited capacity of the chains or belts used to drive the conveyor.

Twisted belt line shaft conveyors are also known in the art. These conveyors do not have to be broken into sections for a long drive as do the belt-driven or chain-driven conveyors, but they cannot be driven at high speeds, because the twisted belts which wrap around the drive shaft and the conveyor rolls have very little surface area contact for driving, and they will slip and fail at high speeds.

Conveyors are known which use a bevel gear or worm gear drive between the line shaft and the conveyor rollers, but these are expensive to manufacture, difficult to maintain, due to the requirements of lubrication, and not suitable for high speed applications for several reasons. For example, the gear sets require precise location for proper drive on the pitch line to reduce noise and wear. High speed gear sets need an enclosed housing to provide lubrication, which adds expense to the conveyor. Also, it is not possible to compensate for the wear of the gears, so gears would have to be replaced frequently in a high speed application. Thus, it would be very impractical to drive a high speed conveyor by means of gears.

Some line shaft conveyors are known to use friction wheels to transmit drive from the drive shaft to the conveyor roller, but these conveyors have not been commercially successful. The friction wheel drives typically have at least one wheel which has very little contact surface for driving (i.e., point contact), so the wheels wear out quickly and slip at high speeds. These designs attempt to mimic the twisted belt line shaft conveyors, which, as mentioned above, are not at all suited to high speed applications.

SUMMARY OF THE INVENTION

The present invention provides a high speed conveyor which can operate at much higher speeds than prior art conveyors. It can operate at speeds of 450 feet per minute or higher, as compared with the highest speed of approximately 240 feet per minute in the prior art.

The present invention takes advantage of a line shaft type of drive, so it is not necessary to break the conveyor into pieces with separate drives when the conveyor becomes long.

The present invention provides a smooth, simple drive, which is easy to maintain and is quiet, eliminating the noise and maintenance problems of prior art drives.

The present invention provides for good surface contact of the driving members and provides a spring force which keeps the driving members in contact with each other and which compensates for wear.

The present invention provides a high speed drive arrangement which can be driven as easily in the backward direction as in the forward direction and therefore can be reversed as needed, without any problems involving chain or belt tensioning.

DESCRIPTION OF THE DRAWINGS

FIG. 1 is a schematic top view of a conveyor made in accordance with the present invention;

FIG. 2 is a side view thereof;

FIG. 3 is a view taken along the section 3—3 of FIG. 1;

FIG. 4 is a view taken along the section 4—4 of FIG. 3;

FIG. 5 is an exploded perspective view of the first friction wheel, which is shown in FIGS. 1-4;

DESCRIPTION OF THE PREFERRED EMBODIMENT

Figure 6:
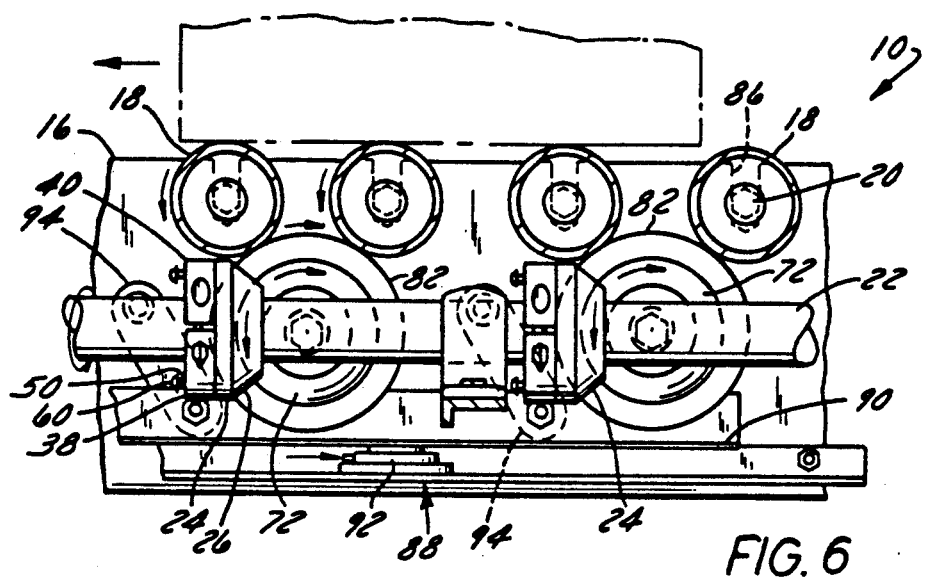
FIG. 6 is a view taken along the section 6—6 of FIG. 1.

The conveyor 10 of the present invention is made up of a conveyor frame 12, with a left side rail 14 and a right side rail 16 and a plurality of conveyor rollers 18 having shafts 20 whose left and right ends are mounted in the left and right side rails, respectively. The axes of rotation of the conveyor rollers 18 are substantially perpendicular to the left and right side rails 14, 16 and to the direction of travel of articles carried by the conveyor 10, as indicated by the arrows in FIGS. 1, 2, and 6.

A motor (not shown) drives a drive shaft 22. The drive shaft 22 lies below the conveyor rollers 18 and has an axis which is substantially parallel to the direction of travel. On the drive shaft 22 at regular intervals are mounted first friction wheels 24. As shown in this embodiment, there is one first friction wheel 24 for every two conveyor rollers 18. The first friction wheels 24 are coaxial with the drive shaft 22. Each first friction wheel 24 has a beveled end 26, which is beveled at an angle alpha from the axis of the drive shaft 22. In this embodiment, the angle alpha is 40 degrees. The first friction wheel 24 is preferably made of a hard material such as steel or nylon.

The first friction wheels are preferably made in three pieces—the first piece 28 is substantially cylindrical and includes the beveled end 26. This first piece 28 will be referred to as the beveled piece. The beveled piece 28 has a central bore 32, which is slightly larger than the diameter of the drive shaft 22. It has a flat back surface 34, which lies in a plane that is perpendicular to the axis of the central bore 32. The back surface 34 defines two cylindrical recesses 36. The second piece 38 and third piece 40 of each first friction wheel 24 are identical to each other. Each of those pieces 38, 40 defines a semi-cylindrical inner surface 42, so that, when the second and third pieces 38, 40 are brought together, they define a cylindrical central bore 44. The semi-cylindrical pieces 38, 40 actually are each slightly less than half a cylinder, so that they can be clamped together to apply force to grip the shaft 22. Each of the semi-cylindrical pieces 38, 40 also defines a flat front surface 46, which is intended to abut the flat back surface 34 of the beveled piece 28, and each of the flat front surfaces 46 defines a bore 48, which can be aligned with the cylindrical recesses 36 in the bevel piece 28 to receive pins 50. The cylindrical recesses 36 in the bevel piece 28 receive the pin 50 with a press fit, so the pins 50 are retained on the bevel pieces 28. The cylindrical bores 48 in the semi-cylindrical pieces 38, 40 have an enlarged entrance portion 52, which permits a spring 54 to be mounted around each pin 50. The springs 54 apply a force which tends to push the bevel piece 28 away from the semi-cylindrical pieces 38, 40. This spring force keeps the bevel piece 28 in driving contact with a second friction wheel, which will be described later. Inside the enlarged entrance openings 52, the cylindrical bores 48 have a reduced diameter, which provides a shoulder 56 for the spring to push against. The reduced diameter portion 58 of the cylindrical bores 48 is large enough to permit the pin 50 to slide relative to the semi-cylindrical pieces 38, 40. Caps 60 are press fit onto the ends of the pins 50 to prevent the pins from sliding out of the semi-cylindrical pieces 38, 40.

Each of the semi-cylindrical pieces 38, 40 also has two radial recesses 62, which receive an insert 64. Each insert 64 is slightly longer than its radial recess 62, so that the insert projects slightly from the semi-cylindrical inner surface 42 of its respective piece 38, 40.

Each of the semi-cylindrical pieces 38, 40 also has a cylindrical bolt-receiving bore 66, which is substantially perpendicular to the axis of the central bore 44, and a hexagonal bore 68, which can be aligned with the bolt-receiving bore 66 of the other semi-circular piece 38, 40. When the bolt-receiving bore 66 of each piece 38, 40 is aligned with the hexagonal bore 68 of the opposite piece 40, 38, bolts 70 and hexagonal nuts 71 are inserted into their respective bolt-receiving bores 66 and hexagonal bores 68 and are threaded together to clamp the pieces 38, 40 onto the shaft 22. (The nuts 71 may be molded as an integral part of the bores 68 as an alternative to the embodiment shown here.) As the bolts 70 are tightened, the inserts 64 contact the drive shaft 22 and press against it. The inserts 64 are preferably made of polyurethane, so that, when the bolts 70 are tightened, the inserts apply a force to the drive shaft 22 which causes the semi-cylindrical pieces 38, 40 to be fixed to the drive shaft 22. The pins 50 cause the beveled piece 28 of the first wheel 24 to rotate with the semi-circular pieces 38, 40, which are fixed to and rotate with the drive shaft. The springs 54 cause the beveled piece 28 of the first friction wheel 24 to be biased in the direction of the beveled end 26.

On the right side rail 16 of the conveyor 10 is mounted a plurality of second friction wheels 72, one for every first friction wheel 22. These second friction wheels 72 are molded onto a hub 74, which is mounted on a bearing 76, which, in turn, is mounted on a stub shaft 78 that is bolted to the right side rail 16. In this manner, the second friction wheel 72 is free to rotate about the axis of the stub shaft 78, which is substantially perpendicular to the right side rail, but the second friction wheel 72 is otherwise in a fixed position relative to the conveyor frame 12, in that it cannot move toward or away from the side rail 16 or up or down relative to the side rail 16. The second friction wheel 72 has a beveled end 80, which lies at an angle beta relative to its axis of rotation. In this embodiment, the angle beta is 50 degrees. As is shown in the drawings, the beveled ends 26, 80 of the first and second friction wheels 24, 72, respectively, have a frustro-conical shape.

The sum of the angles alpha and beta, which are the angles of the bevels on the first and second friction wheels 24, 72, is equal to the angle between the axes of the first and second friction wheels. Also, the beveled surfaces define a line of contact 51, which, when extended, intersects the point of intersection of the axes 47, 49 of the first and second friction wheels, respectively, as shown at the point 53 in FIG. 4. In this embodiment, the axes 47 and 49 of the drive shaft 22 and the stub shaft 78, respectively, intersect at an angle of 90 degrees, and the angles alpha (40 degrees) and beta (50 degrees) are complementary angles, the sum of which is 90 degrees. It is important that the sum of the angles alpha and beta be equal to the angle between the axes of the first and second friction wheels 24, 72, so that the beveled ends 26, 80 mate with at least line contact between them. This provides true rolling contact between the first and second friction wheels and avoids the problems of slippage and failure encountered in prior art designs which have less than line contact. Without this good surface area of contact between the two friction wheels, this conveyor could not operate at such high speeds.

It is also important that the first friction wheel 24 has a spring force biasing it in the direction of the second friction wheel 72, so that, as the beveled faces wear, there will still be good contact between the first and second friction wheels over a large surface area.

A third friction wheel 82 is mounted on the hub 74 between a shoulder 83 on the hub 74 and a snap ring 84 which snaps into a recess in the hub 74. The third friction wheel 82 has a clearance fit with the hub 74 and is centered below two of the conveyor rollers 18, contacting both of those conveyor rollers 18, with line contact between the cylindrical outer surface of the third friction wheel 82 and the cylindrical outer surface of each of those conveyor rollers 18.

The shafts 20 of the conveyor rollers 18 ride in vertical slots 86 in the left and right side rails 14, 16 (shown in FIG. 6), and generally do not reach the bottom of the slots 86, so that the weight of each roller 18 is carried on its respective third friction wheel 82. Of course, the weight of any product that is being carried on the conveyor roller 18 will also be supported by the third friction wheel 82. Since the amount of friction between the third friction wheel 82 and the hub 74 and the amount of friction between the conveyor roller 18 and the third friction wheel 82 increases as the weight of the conveyor roller increases, the amount of friction available to drive the rollers 18 increases as the load increases. This mounting arrangement ensures that there will always be enough friction to drive the conveyor rollers 18, even when they are under heavy loads.

To summarize the drive arrangement in this conveyor: A motor (not shown) drives the drive shaft 22. The rotating drive shaft drives the first friction wheels 24, which are biased toward the second friction wheels 72, and which have contact with the second friction wheels 72 along a line, giving them good surface area contact for driving the second friction wheels 72. The second friction wheels 72 drive their respective hubs 74, which, in turn, drive the third friction wheels 82, and the third friction wheels 82 drive the conveyor rollers 18. The drawings shown here have the drive shaft always rotating in one direction and the articles on the conveyor always moving from left to right. However, the direction of rotation of the drive shaft 22 could readily be reversed, thereby reversing the direction of travel of the articles on the conveyor. Such a simple reversal of direction of drive is not available on prior art drive arrangements.

In many cases, it will be advantageous to operate this high speed conveyor as an accumulating conveyor. In this situation, means can be provided for stopping the conveyor rollers 18 in order to accumulate products on the conveyor. If this conveyor is to operate as an accumulating conveyor, it will preferably include a brake mechanism 88 for stopping the rotation of the third friction wheels 82, which will also cause the conveyor rollers 18 which contact the stopped friction wheels 82 to stop.

Figure 7:
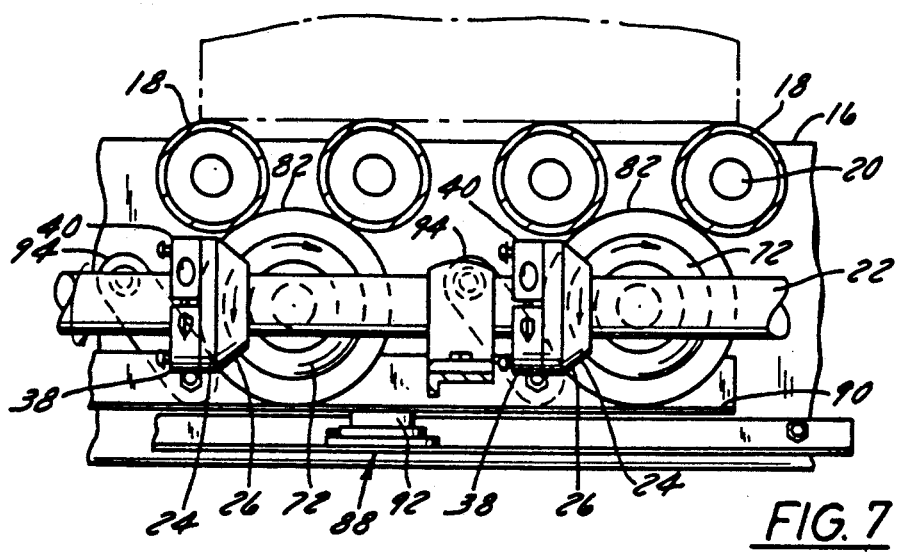
FIG. 7 is the same view as FIG. 6 but with the brake applied to stop the zone of rollers.
Figure 8:
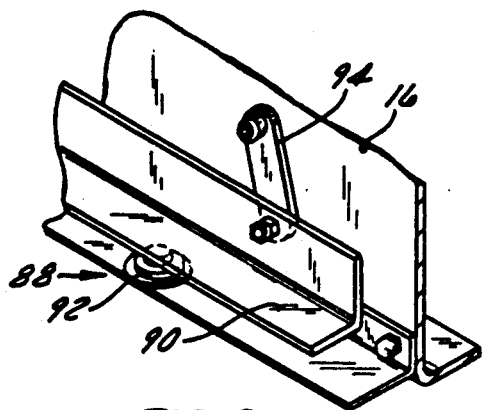
FIG. 8 is a broken-away perspective view of the braking arrangement shown in FIGS. 6 and 7.
Figure 9:
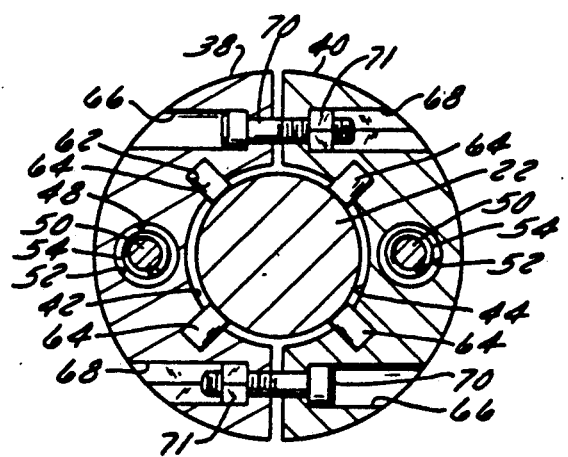
FIG. 9 is a sectional view through the semi-cylindrical portions of the first friction wheel.

The brake mechanism is shown in FIGS. 3, 6, 7, and 8. Each brake mechanism 88 in the embodiment shown here is designed to stop two of the third friction wheels (or drive wheels) 82, which stops four of the conveyor rollers 18. The four conveyor rollers controlled by the brake 88 are then said to be a zone. The brake 88 includes a flat friction bar 90, mounted on a piston-cylinder arrangement 92 (or on some other type of actuator). There are two arms 94 (shown in FIGS. 6-8) which are bolted to the conveyor frame 12 and to the friction bar 90. The arms 94 are mounted so as to pivot relative to the conveyor frame 12 and relative to the friction bar 90, and the distance between the pivot points on each of the arms 94 is the same. As the arms pivot from a lowered, non-braking position, as shown in FIG. 6, to an upper, braking position, as shown in FIG. 7, the equal-length arms 94 provide a parallelogram effect, so that, as the friction bar 90 is pushed upward by the piston 92, the friction bar 90 remains parallel to the third friction wheels 82.

There are sensors (not shown) located at intervals along the conveyor 10, as is known in the art for accumulation conveyors. When the sensors sense a back-up of products, they begin to cause fluid to enter the cylinders 92 in the zones in which products are to accumulate, causing the friction bars 90 for those zones of the conveyor 10 to move upward until they contact their respective drive wheels 82, causing those drive wheels 82 to stop rotating. These drawings show each friction bar 90 contacting two drive wheels 82, but it would be possible for each friction bar to contact any desired number of drive wheels 82, depending upon the desired length of the zone. The clearance fit between the third friction wheels 82 and their hubs 74 facilitates this process, permitting the hubs 74 to continue rotating freely even when the brake is applied, so as not to interfere with the driving of the other parts of the conveyor 10.

It will be obvious to those skilled in the art that modifications may be made to the embodiment described above without departing from the scope of the present invention.

What is claimed is:

1. A conveyor, comprising:
   a drive shaft;
   a conveyor frame;
   a conveyor roller mounted on the conveyor frame and having an axis which is substantially perpendicular to the drive shaft;
   a first friction wheel, mounted on the drive shaft and having an axis which is coaxial with the drive shaft, said first friction wheel having a first beveled end which is beveled at a first angle to the axis of the first friction wheel;
   mounting means for mounting the first friction wheel on the drive shaft so that the first friction wheel rotates with the drive shaft, including means for biasing said first friction wheel in the direction of the beveled end;
   a second friction wheel shaft mounted on the conveyor frame and extending substantially parallel to the axis of said conveyor roller;
   a second friction wheel, mounted on said second friction wheel shaft, said second friction wheel having an axis and a second beveled end which is beveled at a second angle to the axis of the second friction wheel, with the sum of the angles of the bevels on the first and second friction wheels being equal to the angle between the axes of the first and second friction wheels, so that the beveled ends of the first and second friction wheels mate with at least line contact between them; and
   means for driving the conveyor roller from the second friction wheel, including a drive wheel mounted on said second friction wheel shafted by mounting means which put said drive wheel in friction driving contact with said conveyor roller, wherein said mounting means causes said drive wheel to rotate with said second friction wheel, so as to drive said conveyor roller, and permits said drive wheel to be selectively stopped while said second friction wheel is rotating, so as to stop the rotation of said conveyor roller.

2. A conveyor as recited in claim 1, wherein said mounting means comprises:
   a hub mounted on the second friction wheel shaft and supporting the second friction wheel such that, when the second friction wheel rotates, the hub rotates; and
   wherein said drive wheel is mounted on said hub with a clearance fit.

3. A conveyor as recited in claim 1, wherein the first friction wheel has a fixed axis of rotation and is limited in motion to rotation about its axis and to sliding along its axis, and wherein the second friction wheel is limited in motion to rotation about its axis.

4. A conveyor as recited in claim 2, wherein said conveyor frame has first and second conveyor side rails which define slots, and said conveyor roller has a shaft which rides in said slots, such that the weight of said conveyor roller is supported on said drive wheel, reducing the clearance and causing the friction force between the drive wheel and the hub to increase as the weight of the articles on the conveyor roller increases.

5. A conveyor as recited in claim 1, wherein said first friction wheel includes:
   a. a substantially cylindrical member which includes said first beveled end and defines a central bore, which receives said drive shaft with a sliding fit;
   b. first and second semi-cylindrical members, which are identical to each other and which are clamped together around said drive shaft, applying a gripping force to said drive shaft so as to be fixed to said drive shaft; and
   c. at least one spring mounted between the cylindrical member and the clamped-together first and second semi-cylindrical members so as to bias the cylindrical member and said first beveled end away from the clamped-together first and second semi-cylindrical members and toward said second beveled end.

6. A conveyor, comprising:
   a drive shaft;
   a conveyor frame;

a conveyor roller mounted on the conveyor frame and having an axis which is substantially perpendicular to the drive shaft;

a first friction wheel, mounted on the drive shaft and having an axis which is coaxial with the drive shaft, said first friction wheel having a beveled end which is beveled at a first angle to the axis of the first friction wheel;

mounting means for mounting the first friction wheel on the drive shaft so that the first friction wheel rotates with the drive shaft, including means for biasing said first friction wheel in the direction of the beveled end;

a hub mounted on the conveyor frame;

a second friction wheel, mounted on the hub such that, when the second friction wheel rotates, said hub rotates, said second friction wheel having an axis and a beveled end which is beveled at a second angle to the axis of the second friction wheel, with the sum of the angles of the bevels on the first and second friction wheels being equal to the angle between the axes of the first and second friction wheels, so that the beveled ends of the first and second friction wheels mate with at least line contact between them; and means for driving the conveyor roller from the second friction wheel, including a drive wheel mounted on said hub, said drive wheel having an outer surface which has friction contact with said conveyor roller; and further comprising braking means for selectively stopping the rotation of the drive wheel while said hub is rotating.

7. A conveyor as recited in claim 6, wherein there is a plurality of said conveyor rollers mounted on said conveyor frame, and a plurality of said drive wheels, and wherein each of said drive wheels contacts and drives two of said conveyor rollers.

8. A conveyor as recited in claim 7, wherein there is a braking means for stopping each of said drive wheels.

9. A conveyor, comprising:

a drive shaft;

a conveyor frame;

a conveyor roller mounted on the conveyor frame and having an axis which is substantially perpendicular to the drive shaft;

a first friction wheel, mounted on the drive shaft, including:

a. a substantially cylindrical member which includes a first beveled end and defines a central bore, which receives said drive shaft with a sliding fit;

b. first and second semi-cylindrical members, which are identical to each other and which are clamped together around said drive shaft, applying a gripping force to said drive shaft so as to be fixed to said drive shaft; and c. at least one spring mounted between the cylindrical member and the clamped-together first and second semi-cylindrical members so as to bias the cylindrical member and said first beveled end away from the clamped-together first and second semi-cylindrical members;

a second friction wheel shaft fixed to the conveyor frame;

a second friction wheel, mounted on said second friction wheel shaft, said second friction wheel having a second beveled end, which is in friction contact with said first beveled end; and a drive wheel, mounted on said second friction wheel shaft, said drive wheel having friction contact with said conveyor roller.

10. A conveyor, comprising:

a drive shaft;

a conveyor frame;

a conveyor roller mounted on the conveyor frame and having an axis which is substantially perpendicular to the drive shaft;

a first friction wheel mounted on the drive shaft;

a second friction wheel shaft, fixed to the conveyor frame;

a second friction wheel mounted on said second friction wheel shaft, said second friction wheel being in friction contact with said first friction wheel;

a drive wheel mounted on said second friction wheel shaft by a mounting means which causes said drive wheel to rotate with said second friction wheel and which permits said drive wheel to be selectively stopped while said second friction wheel is rotating, said drive wheel also having friction contact with said conveyor roller.

11. A conveyor as recited in claim 10, wherein said mounting means includes a hub, mounted on said second friction wheel shaft, wherein said second friction wheel is mounted on said hub such that, when said second friction wheel rotates said hub rotates, and wherein said drive wheel is loosely mounted on said hub such that said drive wheel can rotate with said hub and can selectively be stopped while said hub is rotating.

* * * * *